Patented Nov. 11, 1947

2,430,562

UNITED STATES PATENT OFFICE 2,430,562

POLYMERIZATION OF BUTADIENE-1,3 HYDROCARBONS

Charles F. Fryling, Akron, Ohio, assignor to The B. F. Goodrich Company, New York, N. Y., a corporation of New York No Drawing. Application February 23, 1944, Serial No. 523,576

10 Claims. (Cl. 260—84.5)

1

This invention relates to the polymerization in aqueous emulsion of butadiene-1,3 hydrocarbons, and mixtures thereof with copolymerizable compounds such as styrene to yield linear polymers of a more or less rubbery nature, and particularly to the modification of such polymerization so as to effect improvements in the efficiency and economy of the polymerization process, and in the uniformity and usefulness of the resulting polymerization products.

While the polymerization in aqueous emulsion of monomeric materials essentially comprising a butadiene-1,3 hydrocarbon such as mixtures of butadiene-1,3 and styrene, generally yields elastic vulcanizable products of a more or less rubbery character, which may be termed "synthetic rubber," it is only when the polymerization is conducted in the presence of a compound of a class well-known to the art as "modifiers for butadiene-1,3 polymerization," that it is possible to obtain commercially useful synthetic rubber possessing properties resembling unvulcanized natural rubber. As a result, it is common practice in the manufacture of synthetic rubber to polymerize in the presence of a modifier of polymerization, this being accomplished heretofore by preparing an emulsion containing the polymerizable material, the modifiers, and any other substances necessary to maintain the emulsion or to accelerate the polymerization; and then agitating the emulsion for a fixed period of time to effect the polymerization.

It has been found, however, that even with this method of procedure, satisfactorily modified synthetic rubbers, that is, synthetic rubbers possessing properties of plasticity, solubility, workability, and viscosity sufficiently close to those of natural rubber to be processed in a generally equivalent manner, and also possessing satisfactory tensile strength and elongation when vulcanized, are not always obtained. For example, when the polymerization is allowed to proceed for a time sufficient to convert substantially all of the monomers into polymers, the polymers obtained are often deficient in plasticity and other processing qualities while, on the other hand, when the time of polymerization is such that only about 65% or less of the monomers are converted into polymers, the products are often soft, weak, inextensible materials and it may be only when the time of polymerization is such that about 65% to 85% of the monomers are converted in polymers that satisfactorily modified synthetic rubbers are generally obtained. In other words, it has been found that the properties of butadiene polymers vary considerably with the extent of polymerization and that this necessitates closely regulating the time of polymerization so that the polymerization will be carried to and only to the desired extent.

2

But, since the rate of polymerization and the properties of the polymers also vary considerably with the nature of the various ingredients present in the emulsion and the conditions of polymerization, it is extremely difficult to exercise such close control over the process that the polymerization is terminated at a point consistent with proper polymer properties, and as a result, there is considerable lack of uniformity in the synthetic rubber produced.

It has now been discovered that the variation in the product with the extent of polymerization is due largely to the fact that the modifier of polymerization is used up rapidly during the polymerization, and that, as a result, the soft products of the first stages of the reaction are "over-modified," while the tough, non-plastic products which are often obtained in the latter stages are "under-modified," the product at 65 to 85% conversion being a mixture of the over and under-modified products with the best combination of properties. It has also been found that the variation in products with the extent of polymerization may be overcome to a large extent, and that the polymerization may be conducted in such a manner that the product is equally well modified throughout the duration of the polymerization, by providing modifiers continuously to the emulsion during at least a part of the polymerization reaction. In this manner, it thus becomes possible to obtain uniformly well-modified products without exercising such a close control over the polymerization; to utilize more efficiently the modifiers of polymerization with the result that a lesser quantity of modifiers is required, and therefore a more economical process is effected; and to carry the polymerization to higher conversion of monomers into polymers while still obtaining a well-modified product.

This invention accordingly comprises the continuous providing of a modifier for butadiene-1,3 polymerization to an aqueous emulsion in which a monomeric material essentially comprising such a butadiene-1,3 hydrocarbon is being polymerized, for at least a part of the time that the monomers are polymerized. Preferably, the modifier is provided continuously throughout the duration of the polymerization. However, it is also within the scope of this invention to provide the modifier continuously during only those stages of polymerization during which the polymer formed would tend to be under-modified if the modifier were all added prior to polymerization. For example, if the polymerization is effected for a time sufficient for about 75% or more of the monomers to be converted into polymers, it is often desirable to add a part of the modifier prior to polymerization, and to provide the remainder of the modifier continuously only from the time that 25% of the monomers are converted into polymers to the time at which the polymerization is terminated. It is essential, however, that the modifier be provided continuously during at least a substantial part of the total polymerization time, since the simple addition of quantities of modifier at various stages of the polymerization does not produce the desired results. The time of polymerization may, of course, be varied depending upon the rate of the reaction, and upon whether it is desired to convert all or only a part of the monomers into polymeric products.

The provision of the modifiers to the emulsion during the polymerization may be accomplished in a number of different ways. For example, the modifier may be added to the emulsion extraneously, either as such or in solution in a suitable solvent, or in emulsion, etc. Another method, with which this invention is particularly concerned, is to generate the modifier in situ throughout all or a substantial part of the time during which the polymerization is effected. This may be accomplished by including in the emulsion either prior to the polymerization or during the polymerization, a reactant or reactants which under the conditions of the polymerization undergo a chemical change to produce the desired modifier, as will hereinafter be explained.

Any of the well-known modifiers for butadiene-1,3 hydrocarbon polymerization, all of which are known to improve the plasticity and solubility of polymers and copolymers of butadiene-1,3 hydrocarbons prepared in their presence, may be provided continuously to aqueous emulsions of butadiene-1,3 hydrocarbons undergoing polymerization, according to the method of this invention. Examples of such modifiers include a large number of sulphur-containing modifiers, which are the preferred materials, as well as other types of modifiers, including chlorinated aliphatic compounds containing at least two chlorine atoms connected to a single carbon atom, such as carbon tetrachloride, certain nitrogen-containing compounds, such as diazoamino benzene and others.

The preferred sulphur-containing modifiers are generally organic sulphur-containing compounds having at least four carbon atoms, and at least one divalent sulphur atom which is not a part of a ring structure, and which is connected by its two valances to two different atoms, at least one of which is a carbon atom. In other words, the sulphur-containing modifier will generally possess the characterisitc structure C—S—X, wherein "X" is any atom capable of forming a univalent bond with a divalent sulphur atom, and C and X are not joined together in a ring structure. While X in this structure is ordinarily a non-metallic atom such as another carbon or a hydrogen, nitrogen, sulphur or phosphorus atom, in some types of compounds it may also even be a metallic atom. However, in the most effective modifiers, as will be seen hereinafter, "X" in the above structure is hydrogen or sulphur or a plurally bound non-metallic atom such as a carbon atom present in a carbonyl or thiono group; and also in many of the most effective modifiers the carbon atom in the above structure is also a doubly bound carbon atom such as the carbon of the thiono group.

One particularly important class of sulphur-containing modifiers is the mercaptans or thiols containing at least four carbon atoms. In these compounds the divalent sulphur atom is connected by one of its valances to a carbon atom, and by the other of its valances to a hydrogen atom. Included in this class in general are all compounds of the formula, R—S—H, wherein R is a univalent organic residue having its univalent bond on a carbon atom such as an aliphatic, aromatic, alicyclic or heterocyclic organic radical. In the aliphatic mercaptans which are the most useful mercaptan modifiers the aliphatic radical R may be any aliphatic hydrocarbon radical whether straight chained or branched, primary, secondary, or tertiary, saturated or unsaturated or it may even be a radical containing, in addition to carbon and hydrogen, various substituents such as nitro, chloro, alkoxy and amino; and the nature of the alicyclic, aromatic and heterocyclic mercaptans may similarly be varied. Aliphatic mercaptans wherein the aliphatic radical R is an alkyl group containing from 8 to 16 carbon atoms are at present the especially preferred materials. The following are examples of the preferred aliphatic mercaptans and of various other mercaptan modifiers:

n-Octyl mercaptan
Decyl mercaptan
Lauryl mercaptan
Tri-isobutyl mercaptan
Dodecenyl mercaptan
Isoheptyl mercaptan
Chloroctyl mercaptan
Benzyl mercaptan
Pinene mercaptan
Cyclohexyl mercaptan
Beta-mercapto ethyl benzyl ether
Thiobetanaphthol
o-Nitro thiophenol
Mercaptobenzothiazole
4-phenyl-2-mercapto thiazole Another particularly preferred class of sulphur-containing modifiers consists of the esters and sulfides of xanthogenic acids (i. e., the non-metallic xanthogenates), which contain at least four carbon atoms and a divalent sulphur atom present in a

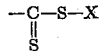

structure. This class of modifiers referred to herein as "non-metallic xanthogenates" includes compounds of the following types:

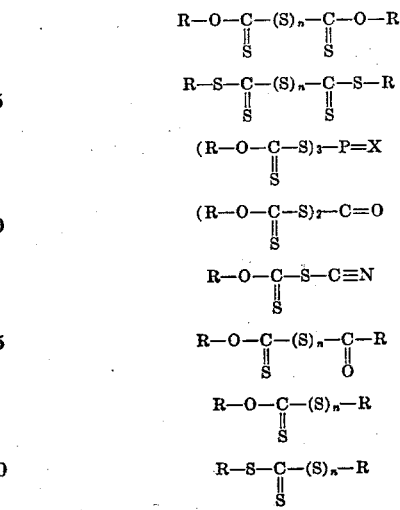

wherein R is the same as defined above, and $n$ is a small integer, say from 1 to 4. Of these types of compounds the dialkyl dixanthogens or bis- (alkyl xanthogens), i. e. compounds of the formula $$R_1-O-\underset{\underset{S}{\|}}{C}-S-S-\underset{\underset{S}{\|}}{C}-O-R_1$$

wherein $R_1$ is an alkyl group containing from 1 to 7 carbon atoms, such as bis-(isopropyl xanthogen), bis-(n-butyl xanthogen) etc. are particularly preferred. Examples of other compounds of these types include:

Ethyl xanthogenyl monosulfide
Isopropyl thioxanthogenyl monosulfide
Isopropyl thioxanthogenyl tetrasulfide
Bis-(tetrahydrofurfuryl xanthogen)
n-Butyl thioxanthogenyl trisulfide
Tri-(isopropyl xanthogenyl) trithiophosphate or tris-(isopropoxythiono) trithiophosphate (reaction product of sodium isopropylxanthate and phosphorus oxychloride)
Tri-(ethyl xanthogenyl) tetrathiophosphate or tris-(ethoxythiono) tetrathiophosphate (reaction product of sodium ethyl xanthate and phosphorus thiochloride)
Bis-(isopropyl xanthogenyl) dithiocarbonate or bis-(isopropoxythiono) dithiocarbonate (reaction product of sodium isopropyl xanthate and phosgene)
Isopropyl xanthogenyl thiocyanate or isopropoxythiono cyano monosulfide (reaction product of sodium isopropyl xanthate and cyanogen chloride)
Isopropyl xanthogenyl benzoyl monosulfide or isopropoxy thiono benzoyl monosulfide (reaction product of sodium isopropyl xanthate and benzoyl chloride)

While the above-described mercaptans and non-metallic xanthogenates have been found to be the most effective modifiers for butadiene-1,3 polymerization, and are ordinarily made use of in this invention, other sulphur-containing compounds including various organic sulfides, disulfides and polysulfides, thioic acids, dithioic acids and thiocarbamic acids and their salts, esters and sulfides are also polymerization modifiers and may, if desired, be utilized. The following compounds are examples of other sulphur-containing modifiers:

Diphenyl disulfide
Dibenzoyl disulfide
Tetramethyl thiuram disulfide
Tetramethyl thiuram monosulfide
Dibenzothiazyl disulfide
Tolyl trisulfide
Thiobenzoic acid
Sodium dimethyl dithiocarbamate
Di-p-nitrophenyl disulfide
Thiazyl-2-disulfide
Benzoyl ethyl sulfide
Dimethylammonium dimethyl dithiocarbamate
Piperidinium cyclopentamethylene dithiocarbamate In the practice of the invention, any of the above-described modifiers is continuously added to or generated in aqueous emulsions containing monomeric materials comprising a butadiene-1,3 hydrocarbon undergoing polymerization. In addition to the monomeric materials undergoing polymerization, that is, the butadiene-1,3 hydrocarbon either alone or in admixture with other monomers copolymerizable therewith, such as styrene, the emulsion will also, of course, contain an emulsifying agent and may also contain various other substances such as polymerization initiators and polymerization catalysts, the presence of which is desirable in order that the polymerization is carried out in the shortest possible time. The polymerization of the monomeric materials present in such emulsions is ordinarily effected by continuously agitating the emulsion at a temperature of about 20 to 70° C. for a period of time varying from about two to fifty hours.

When the invention is carried out by adding modifiers extraneously to the emulsion undergoing polymerization, the nature of the ingredients present in the emulsion and the conditions of the polymerization may be varied widely without affecting the continuous provision of the modifiers. However, when the continuous provision of the modifiers is effected by generating the modifiers internally in the emulsion in situ, it will of course be necessary to prepare the emulsion and to select the conditions of the polymerization, both with a view to producing the polymer at a rapid rate, and with a view of regulating the conditions present in the emulsion in such a manner that the generation of the modifier may take place.

This preferred expedient of forming the modifiers in situ may be accomplished in a number of different ways, depending upon the particular modifier to be generated, the nature of the emulsion in which the polymerization is taking place, and the conditions of that polymerization. In general, the generation in situ is effected by carrying out in the emulsion being polymerized a chemical reaction which continuously yields one or more of the above-mentioned modifiers as the product. The chemical reaction adapted to form the modifier may be an oxidation-reduction reaction, a hydrolysis reaction, a decomposition, a condensation or any other time-consuming reaction which is capable of being effected under the conditions of the emulsion polymerization to form a modifier, and may be brought about by adding to the emulsion prior to the polymerization or during the polymerization, substances which react under the conditions of the emulsion polymerization to form the modifier. These reactants are preferably substances which themselves exert no harmful effect on the polymerization either by way of destroying the emulsifying agent, or by inhibiting or retarding the polymerization. As will hereinafter appear, it is often possible to choose these reactants in such a manner that, besides generating the modifiers continuously during the polymerization, they also otherwise favorably influence polymerization as by acting as polymerization initiators or polymerization catalysts or as emulsifying agents. It is also preferred to choose the reaction in such a manner that other products of the reaction, if any, in addition to the modifiers, also exert a favorable rather than an unfavorable influence on the polymerization.

The reactants employed may even themselves be modifiers of polymerization which react under the conditions of polymerization, either in the presence or absence of other reactants, to give more powerful modifiers, since in this event the effect is to provide modifiers during the polymerization. However, if the reactants themselves are powerful modifiers of polymerization such as the mercaptans and non-metallic xanthogenates mentioned above, their reaction during polymerization to yield other less powerful modifiers of polymerization is not included in the invention, since in this event the effect is not to provide modifier, but rather is to remove modifier.

One preferred method of generating modifiers in situ consists of reacting in the emulsion during the polymerization water-soluble substances which interact in the aqueous phase of the emulsion to form a modifier which is soluble in the non-aqueous phase of the emulsion, since in such reactions the modifier formed is continuously supplied from the aqueous to the non-aqueous phase. Another preferred method is to include in the emulsion substances which interact by an oxidation-reduction reaction to yield a modifier, since the conditions most favorable for polymerization often also favor oxidation-reduction reactions. Still another preferred type of reaction which is easily effected in the emulsion consists in hydrolyzing, either in acid or alkaline medium, a substance which hydrolyzes to give a modifier. In such hydrolysis reactions control of the pH during the polymerization so that the hydrolysis proceeds continuously during the desired phase of the polymerization may be necessary, and may be effected by adding acid or bases to the emulsion during the polymerization.

Since the mercaptans and the non-metallic xanthogenates mentioned above are the most effective polymerization modifiers, the generation of such substances in situ continuously during polymerization constitutes the preferred embodiment of the invention. The preferred method of generating modifiers of the mercaptan type in situ is by the hydrolysis or decomposition of derivatives of mercaptans. Thus, mercaptals derived from mercaptans containing at least four carbon atoms and aldehydes such as acetaldehyde, butyraldehyde or the like, and mercaptols derived from such mercaptans and ketones such as acetone and methyl ethyl ketone may be decomposed in emulsions containing butadiene-1,3 hydrocarbons undergoing polymerization to liberate continuously mercaptan modifiers and aldehydes or ketones, which have no unfavorable effect on the polymerization. For example, the addition of methyl dilauryl mercaptal, acetone lauryl mercaptol and the like to an emulsion of a butadiene-1,3 hydrocarbon results in the continuous generation of lauryl mercaptan in situ during the subsequent polymerization. Similarly other mercaptan derivatives such as alkyl isothioureas, various thioesters of both organic and inorganic acids and the like may be hydrolyzed in emulsion to liberate mercaptans in situ during polymerization. Still other methods of generating mercaptans such as by the action of bacteria on certain proteins etc. are also capable of being conducted in the emulsions in which butadiene-1,3 hydrocarbons are being polymerized and may be employed.

The generation of non-metallic xanthogenates, another preferred class of modifiers, in situ is most conveniently accomplished by including in the emulsion an alkali metal xanthate such as sodium xanthate, sodium isopropyl xanthate, potassium butyl xanthate or the like, and some other substance which will react chemically with the xanthate to form a non-metallic xanthogenate modifier. For example, the oxidation of sodium isopropyl xanthate yields bis-(isopropyl xanthogen) thereby providing a convenient method of generating this preferred modifier in situ in the emulsion. Similarly other xanthates may be oxidized to other dixanthogens. Such oxidations are preferably effected using per-salts such as potassium persulfate, sodium perborate and the like as the oxidizing agents and in the presence of heavy metal oxidation catalysts such as sodium ferripyrophosphate since such substances in addition to their function in the generation of the modifier in situ, also act as polymerization initiators and catalysts thereby otherwise favorably affecting the polymerization. Other non-metallic xanthogenates prepared by the condensation reaction of alkali metal xanthates with acid chlorides may be generated in situ by allowing the condensation with the alkali metal xanthate to be affected in the aqueous emulsion being polymerized. For example if sodium isopropyl xanthate and cyanogen chloride are added to the emulsion to be polymerized, isopropoxy thiono cyano monosulfide, a modifier of polymerization, is continuously generated in situ during the polymerization. Similarly other xanthogenate modifiers may be generated in situ by condensation reactions between alkali metal xanthates and phosgene, phosphorus oxychloride, benzoyl chloride, phosphorus thiochloride and the like.

Other reactions capable of yielding these and other modifiers of the type described above are capable of being conducted in aqueous emulsion and may be employed to generate modifiers in situ, as will occur to those skilled in the art.

The duration of the reaction generating the modifier is determined by the conditions present in the emulsion and may be determined readily in any given instance by carrying out the reaction in an emulsion and determining the amount of modifier formed at various stages of the reaction. It is ordinarily not difficult to secure a continuation of modier generation for a period of time up to about 20 hours after charging the reactants to the emulsion, a time in which the polymerization is ordinarily carried to the desired extent.

The amount of modifier generated by the chemical reaction may be controlled in general by the amount of the reactants added to the emulsion for generation of the modifier. In general it is necessary only that small amounts, varying from about 0.1 to 1.0% by weight based on the material polymerized, of the modifier be generated in the emulsion. Preferably this amount of modifier is generated at such a rate that from about .001 to 0.1% of modifier based on the weight of material polymerized is generated per hour, since in this manner a substantially constant concentration of modifier is present during all stages of the polymerization. From the amount of modifier to be generated and the kinetics of the reaction generating the modifier it is of course easy to calculate the amount of reactants to be added to the emulsion in order to produce the desired modifier concentration.

Similarly when the invention is carried out by adding modifier to the emulsion continuously instead of generating it in situ, it is preferred to add about .001 to 0.1% of modifier to the emulsion per hour.

As an example of a preferred embodiment of the invention in which a modifier is generated in situ, bis-(isopropyl xanthogen) is continuously generated by the oxidation of sodium isopropyl xanthate in an emulsion in which a monomeric mixture of butadiene-1,3 and styrene is undergoing polymerization, as follows:

An emulsion is made up containing 75 parts by weight of butadiene-1,3, 25 parts by weight of styrene, 180 parts of water, five parts of fatty acid soap as the emulsifying agent, 0.6 part of potassium persulfate, 0.7 part of sodium isopropyl xanthate and about 0.25 part of a catalyst mixture comprising complex pyrophosphates of iron and cobalt. This emulsion is then agitated at 50° C. for 23 hours, and at the end of this time a polymerization inhibitor such as hydroquinone is added to the emulsion in order to terminate the polymerization. After removing the unpolymerized monomers, the resulting latex-like dispersion is coagulated to produce a rubbery copolymer of butadiene-1,3 and styrene. It is found that an 84% yield is obtained, that is, 84% of the monomers are converted to polymers at this time. The polymer obtained is a plastic, soluble, well-modified synthetic rubber, which when vulcanized possesses a tensile strength of over 3,000 lbs. per sq. in., and an ultimate elongation of over 600%.

When the polymerization is repeated for only 4 hrs., 8 hrs., 14 hrs., and 19 hrs., yields of polymer of 16%, 36%, 71% and 81%, respectively, are obtained. Examination of the polymers produced at these various conversions reveals that in each case well-modified polymers resembling the polymer obtained at 84% conversion are produced, thus showing that the nature of the polymer is substantially independent of the percent conversion. Similarly when the polymerization is carried to 100% conversion, the copolymer produced is still plastic, soluble and well-modified.

When the polymerization is repeated using an equivalent quantity of bis-(isopropyl xanthogen) all added at the beginning of the polymerization, it is found that the properties of the polymers produced vary considerably with the extent of conversion, and that it is only at the higher conversions that suitably modified polymers are obtained. Moreover, the polymers produced at the higher conversions in this manner exhibit lower plasticity and tensile strength than the polymers produced at the same conversion when the modifier is generated in situ.

In another embodiment of the invention a mixture of butadiene-1,3 and styrene is polymerized in an aqueous emulsion containing soap as the emulsifying agent and potassium persulfate as the polymerization initiator for about 20 hours at 50° C. while continuously adding to the emulsion a styrene solution of lauryl mercaptan at a rate such that about 0.03% of the mercaptan based on the weight of material polymerized is added to the emulsion per hour. By taking samples of the emulsion at various times during the polymerization and obtaining the polymers therefrom it is found that the polymeric products produced at from 30 to 90% conversion are all plastic synthetic rubbers possessing substantially the same viscosity, and the final product of the copolymerization is similarly a plastic synthetic rubber of the same viscosity. On the other hand when 0.06% of the mercaptan is added to the emulsion at the beginning of the polymerization, the polymers formed at various conversions vary widely in viscosity and the final product varies depending to what extent the polymerization is carried out.

Other embodiments of the invention similarly show that polymers whose properties are substantially independent of the extent of polymerization, and which therefore do not vary in properties from batch to batch, may be prepared by the continuous provision of modifier during the polymerization in accordance with this invention.

This method of polymerization is applicable not only to the polymerization of butadiene-1,3 and styrene but also, in general, to the polymerization of any butadiene-1,3 hydrocarbon, such as butadiene-1,3, isoprene, 2,3-dimethyl butadiene-1,3, piperylene, and the like either alone or in a mixture in any suitable proportion with one or more unsaturated compounds copolymerizable therewith in aqueous emulsion. Compounds copolymerizable with butadiene-1,3 hydrocarbons in aqueous emulsion include other butadiene-1,3 hydrocarbons, other conjugated dienes such as chloroprene, 2-cyanobutadiene-1,3 and the like, and copolymerizable monoolefinic compounds such as styrene, vinyl naphthalene, para chloro styrene, p-methoxy styrene and other aryl olefins; acrylonitrile, methacrylonitrile, alphachloro acrylonitrile, methyl acrylate, methyl methacrylate, ethyl methacrylate, allyl methacrylate, methyl alpha-chloro acrylate, acrylic acid, methacrylic acid, acrylamide, methacrylamide and other polymerizable acrylic compounds; vinyl ketone, methyl isopropenyl ketone, methyl vinyl ether, methyl vinyl ethynyl carbinol, diethyl fumarate, diallyl maleate, vinylidene chloride, vinyl acetate, vinyl pyridine, isobutylene, and the like. When mixtures of butadiene-1,3 hydrocarbons with such copolymerizable compounds are employed, it is preferable that the butadiene-1,3 hydrocarbons be present in a predominant amount, that is, to the extent of at least 50% by weight of the mixture.

The use of any emulsifying agents, polymerization initiators, accelerators, catalysts or the like in the emulsion during the polymerizations effected in the manner herein described is within the scope of this invention as are many other methods and procedures known to be useful in the emulsion polymerization of butadiene-1,3 hydrocarbons. Moreover, many modifications and variations of the method herein described will be apparent to those skilled in the art. Accordingly the invention is not to be limited by the details herein set forth but only by the spirit and scope of the appended claims.

The polymerization of butadiene-1,3 hydrocarbons in the presence of alkali metal xanthates and per-salts such as potassium persulfate, which results in the continuous generation of bis-(alkyl xanthogen) modifiers in situ, is disclosed in my earlier application Serial No. 429,780, filed Feb. 6, 1942, of which, therefore, this application is a continuation-in-part.

I claim:

1. The method of modifying the polymerization of a monomeric mixture of butadiene-1,3 and styrene which comprises emulsifying the said mixture in an aqueous emulsion, adding to the emulsion an alkali metal xanthate and an oxygen supplying persalt, and polymerizing the said monomeric mixture in the emulsion in the presence of the xanthogen continuously formed by the reaction of the xanthate and the oxygen supplying per salt.

2. The method of modifying the polymerization of a monomeric mixture of butadiene-1,3 and styrene which comprises emulsifying the said mixture in an aqueous emulsion, adding to the emulsion sodium isopropyl xanthate and potassium persulfate, and polymerizing the said monomeric mixture in the emulsion in the presence of the bis-(isopropyl xanthogen) continuously formed by the reaction of the said xanthate and the persulfate.

3. The method which comprises polymerizing a butadiene-1,3 hydrocarbon in an aqueous emulsion in the presence of a water-soluble xanthate and an oxygen supplying per-salt.

4. The method which comprises polymerizing in aqueous emulsion a monomeric mixture containing a butadiene-1,3 hydrocarbon and a smaller amount of a compound copolymerizable therewith in aqueous emulsion, in the presence of an alkali metal alkyl xanthate and an oxygen supplying per-salt.

5. The method which comprises polymerizing in aqueous emulsion a monomeric mixture containing butadiene-1,3 and a smaller amount of compound copolymerizable therewith in aqueous emulsion, in the presence of an alkali metal alkyl xanthate and an oxygen supplying per-salt.

6. The method which comprises polymerizing a monomeric mixture containing butadiene-1,3 and a smaller amount of acrylonitrile in an aqueous emulsion in the presence of sodium isopropyl xanthate and an oxygen supplying per-salt.

7. The method which comprises polymerizing a monomeric mixture containing butadiene-1,3 and a smaller amount of styrene in an aqueous emulsion in the presence of sodium isopropyl xanthate and an oxygen supplying per-salt.

8. The method which comprises polymerizing a butadiene 1,3 hydrocarbon in aqueous emulsion in the presence of an alkali metal alkyl xanthate and an oxygen supplying per-salt.

9. The method which comprises polymerizing in aqueous emulsion a monomeric mixture containing butadiene-1,3 and a smaller amount of a compound copolymerizable therewith in aqueous emulsion, in the presence of an alkali alkyl xanthate and an alkali metal persulfate.

10. The method which comprises polymerizing a butadiene-1,3 hydrocarbon in aqueous emulsion in the presence of sodium isopropyl xanthate and potassium persulfate.

CHARLES F. FRYLING.

REFERENCES CITED

The following references are of record in the file of this patent:

UNITED STATES PATENTS

| Number | Name | Date |
|---|---|---|
| 1,896,491 | Luther | Feb. 7, 1937 |
| 2,281,613 | Wollthan | May 5, 1942 |